(12) United States Patent
Tokura et al.

(10) Patent No.: US 7,598,999 B2
(45) Date of Patent: Oct. 6, 2009

(54) ELECTRONIC DEVICE POWERED BY FUEL CELL AND POWER SUPPLY SYSTEM USING FUEL CELL

(75) Inventors: Go Tokura, Yokohama (JP); Hiroshi Kikuchi, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 11/352,688

(22) Filed: Feb. 13, 2006

(65) Prior Publication Data

US 2006/0181636 A1 Aug. 17, 2006

(30) Foreign Application Priority Data

Feb. 17, 2005 (JP) ............................. 2005-040753

(51) Int. Cl.
*H04N 5/225* (2006.01)
(52) U.S. Cl. ........................................ 348/372; 429/34
(58) Field of Classification Search ........................ None
See application file for complete search history.

(56) References Cited

U.S. PATENT DOCUMENTS

| | | | |
|---|---|---|---|
| 6,057,051 A | 5/2000 | Uchida et al. | |
| 6,506,513 B1 * | 1/2003 | Yonetsu et al. | 429/34 |
| 6,537,690 B1 * | 3/2003 | Karrupaiah et al. | 429/13 |
| 7,074,511 B2 * | 7/2006 | Becerra et al. | 429/34 |
| 7,105,244 B2 * | 9/2006 | Kamo et al. | 429/32 |
| 7,141,320 B2 * | 11/2006 | Ito et al. | 429/12 |
| 2004/0219414 A1 * | 11/2004 | Ozeki | 429/34 |
| 2004/0258976 A1 * | 12/2004 | Nishizawa | 429/34 |
| 2005/0003257 A1 * | 1/2005 | Willimowski et al. | 429/34 |
| 2005/0008918 A1 * | 1/2005 | Nakakubo et al. | 429/34 |
| 2005/0282048 A1 * | 12/2005 | Kamo et al. | 429/12 |
| 2007/0059583 A1 * | 3/2007 | Vinsant | 429/39 |
| 2009/0086087 A1 * | 4/2009 | Kikuchi et al. | 348/372 |

FOREIGN PATENT DOCUMENTS

| | | |
|---|---|---|
| JP | 9-213359 A | 8/1997 |
| JP | 2003-344919 A | 12/2003 |

\* cited by examiner

*Primary Examiner*—Ngoc-Yen T Vu
(74) *Attorney, Agent, or Firm*—Canon U.S.A., Inc. I.P. Division (57) ABSTRACT

An electronic device powered by a fuel cell and a power supply system using a fuel cell include a first generating cell supplied with fuel directly from a fuel tank and a second generating cell supplied with fuel through the first generating cell. The second generating cell has a capacity different from the capacity of the first generating cell.

19 Claims, 6 Drawing Sheets

ELECTRONIC DEVICE POWERED BY FUEL CELL AND POWER SUPPLY SYSTEM USING FUEL CELL

BACKGROUND OF THE INVENTION

1. Field of the Invention

The present invention relates to an electronic device, such as a camera, powered by a fuel cell and a power supply system for the same which uses a fuel cell.

2. Description of the Related Art

As disclosed in Japanese Patent Laid-Open No. 9-213359 (corresponding to U.S. Pat. No. 6,057,051), a known fuel cell apparatus includes a fuel cell body that generates electricity, a fuel tank for storing fuel to be supplied to the fuel cell body, a fuel supply unit, an air supply fan, and a control unit that controls power generation of the fuel cell body. These components are housed in a case, as a unit. The fuel cell apparatus is housed in a fuel cell chamber provided in an electronic device, for example, a computer.

Figure 6A:
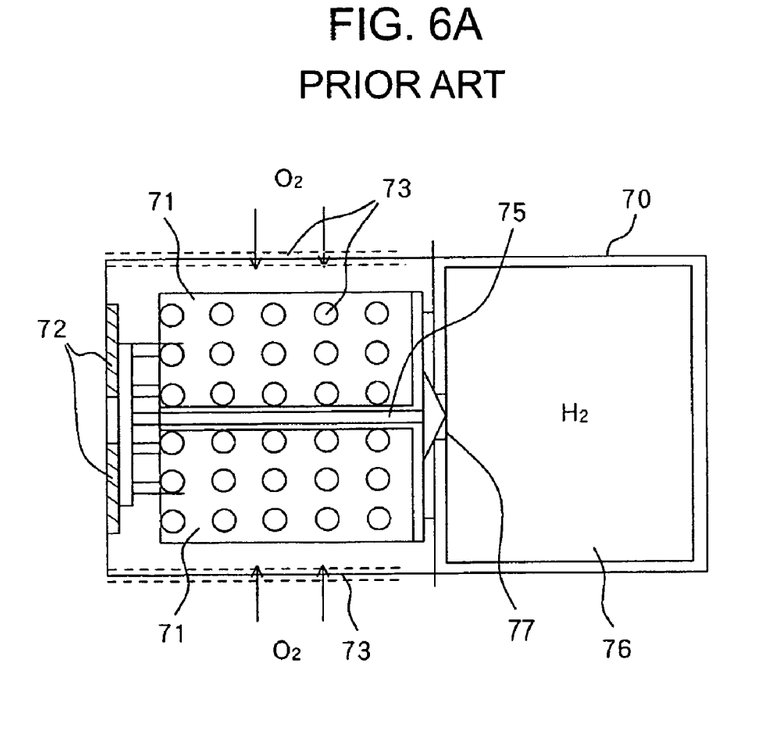
FIGS. 6A and 6B illustrate the structure of a conventional fuel cell.
Figure 6B:
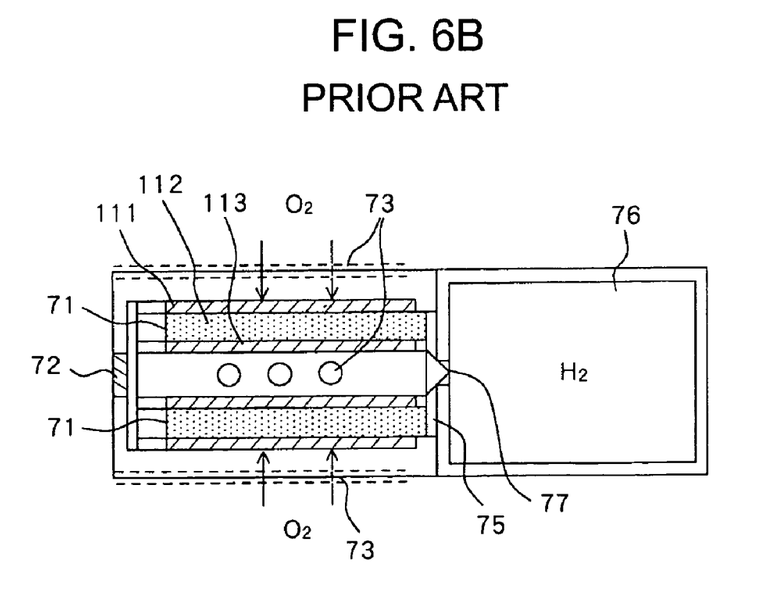

The basic configuration of a commonly used fuel cell will be described with reference to FIGS. 6A and 6B. FIG. 6A is a plan view of a fuel cell, and FIG. 6B is a front view thereof.

This fuel cell has vents 73 for taking in air including oxygen used as an oxidizer for reaction. The vents 73 are provided in the top, bottom, front, and back surfaces of a case 70. The vents 73 are also responsible for discharging generated water in the form of vapor and for exhausting heat generated by the reaction. Electrodes 72 for outputting electricity are provided in a side surface of the case 70.

The case 70 houses generating cells 71, a fuel tank 76, a fuel supply path 75, and a pressure sensor 77. Each fuel cell 71 includes a fuel electrode 113, a polyelectrolyte membrane 112, an oxidizer electrode 111, and a catalyst. The fuel supply path 75 connects the fuel tank 76 with the fuel electrode 113 of each generating cell 71. The pressure sensor 77 measures the pressure of fuel.

The fuel (for example, hydrogen) stored in the fuel tank 76 is supplied to the fuel electrode 113 through the fuel supply path 75. The oxidizer electrode 111 is supplied with air through the vents 73. The electricity generated in the generating cells 71 is supplied to an electronic device through the electrodes 72.

There is proposed a technique that makes it possible to use portable electronic devices (for example, a notebook computer, camera, and camcorder) for long hours by providing the above-described fuel cell in the portable electronic devices. In Japanese Patent Laid-Open No. 2003-344919, there is proposed a technique for stably supplying power to an electronic device (digital camera) despite rapid change in the power consumption, by controlling the current supply from a fuel cell to two secondary cells depending on whether the power is ON or OFF, modes of the digital camera, and remaining capacity of the secondary cell serving as a main power source. In addition, there is proposed a technique for preventing deterioration of generating cells of a fuel-cell apparatus by controlling fuel supply to the fuel cells.

The above-described known fuel-cell apparatus temporarily stores electric power generated using a generating cell before supplying. That is to say, the fuel-cell apparatus generates electricity using a generating cell, and then converts the power appropriately for control of the electronic device. Therefore, the cell has a relatively large generation capacity according to the maximum power consumption of the electronic device, and the cell is always filled with fuel, so that the maximum output can always be obtained.

However, electronic devices such as a camera include circuits that consume a small power and circuits that consume a large power. For example, in a standby mode in which the electronic device maintains only display function, power consumption is small, and therefore the maximum output of the generating cell is not necessary.

In other words, in the electronic device including circuits or controls having different power consumption, the generating cell is always filled with fuel and always performs power generation at maximum output even when a small amount of power is enough. Since power generation (fuel supply) is not performed appropriately for characteristics of the circuits or the controls, processing and control depending on circuits are needed. This complicates the configuration of circuits.

If the cell is filled with fuel for long hours, the fuel in contact with the medium is consumed. In addition, the cell deteriorates, and consequently generating efficiency deteriorates. Due to deterioration of the generating cell, the user needs to replace the cell frequently. In the case where a fuel-cell apparatus has only a single cell, the user needs to replace the entire cell. This increases the burden on the user.

In the above-described fuel-cell apparatus of Japanese Patent Laid-Open No. 2003-344919, fuel is supplied to a plurality of cells. However, the remaining amount of fuel in each cell needs to be checked individually. This complicates the control of fuel supply.

SUMMARY OF THE INVENTION

The present invention has been made in consideration of the above situation, and provides an electronic device and a power supply system capable of excellent power supply and control.

In an aspect of the present invention, an electronic device includes a first generating cell supplied with fuel directly from a fuel tank, and a second generating cell supplied with fuel through the first generating cell. The second generating cell has a capacity different from the capacity of the first generating cell.

In another aspect of the present invention, a power supply system includes a fuel tank, a first generating cell supplied with fuel directly from the fuel tank, and a second generating cell supplied with fuel through the first generating cell. The second generating cell has a capacity different from the capacity of the first generating cell.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Various embodiments, features, and aspects of the present invention will be described in detail in accordance with the accompanying drawings.

First Exemplary Embodiment

Figure 1:
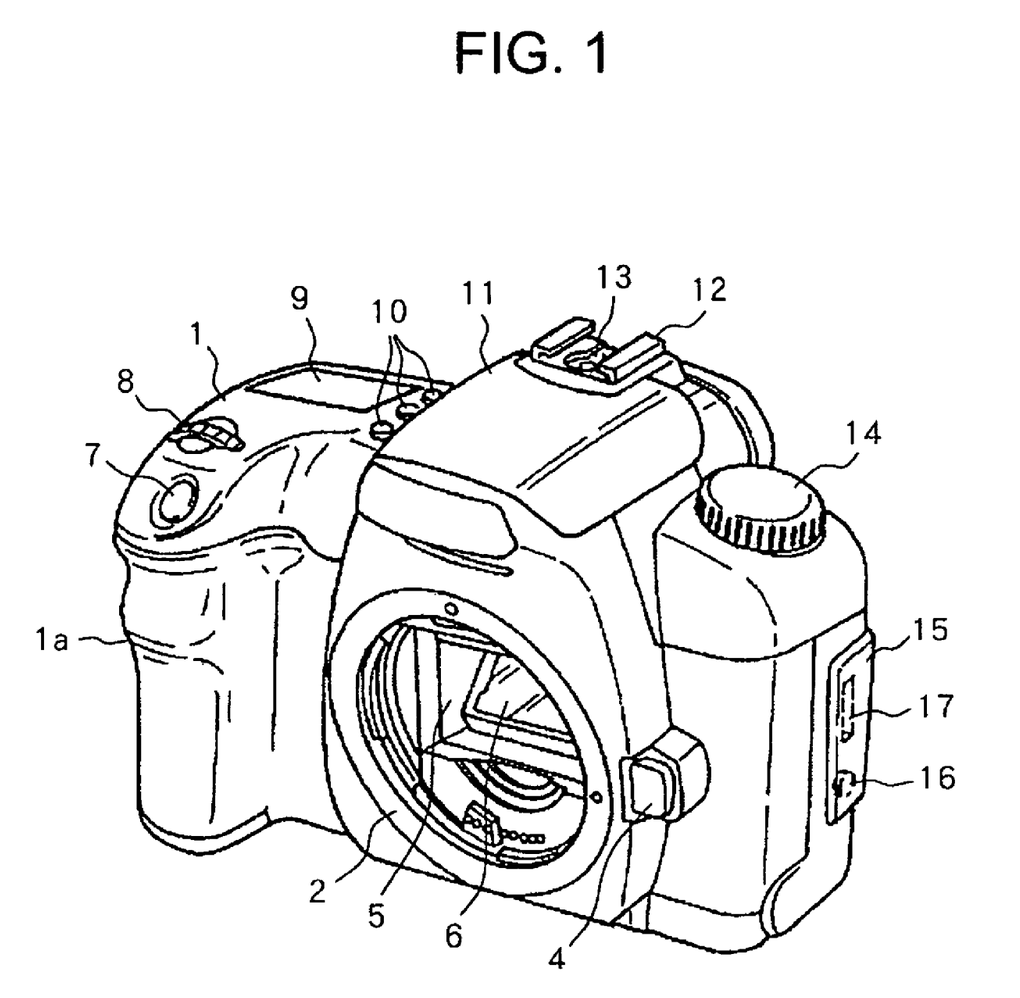
FIG. 1 is an exterior front perspective view of an exemplary electronic device, such as a camera, according to an embodiment of the present invention.
Figure 2:
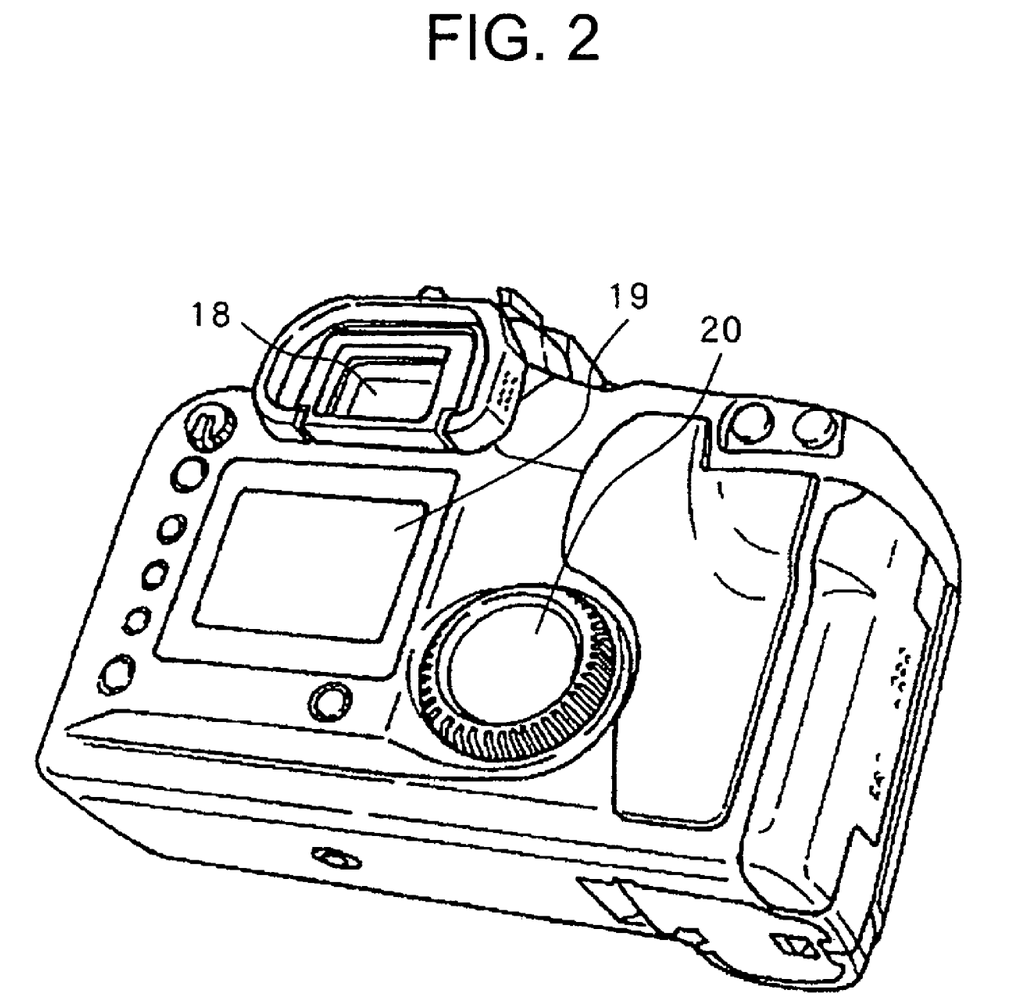
FIG. 2 is an exterior rear perspective view of the electronic device.
Figure 3:
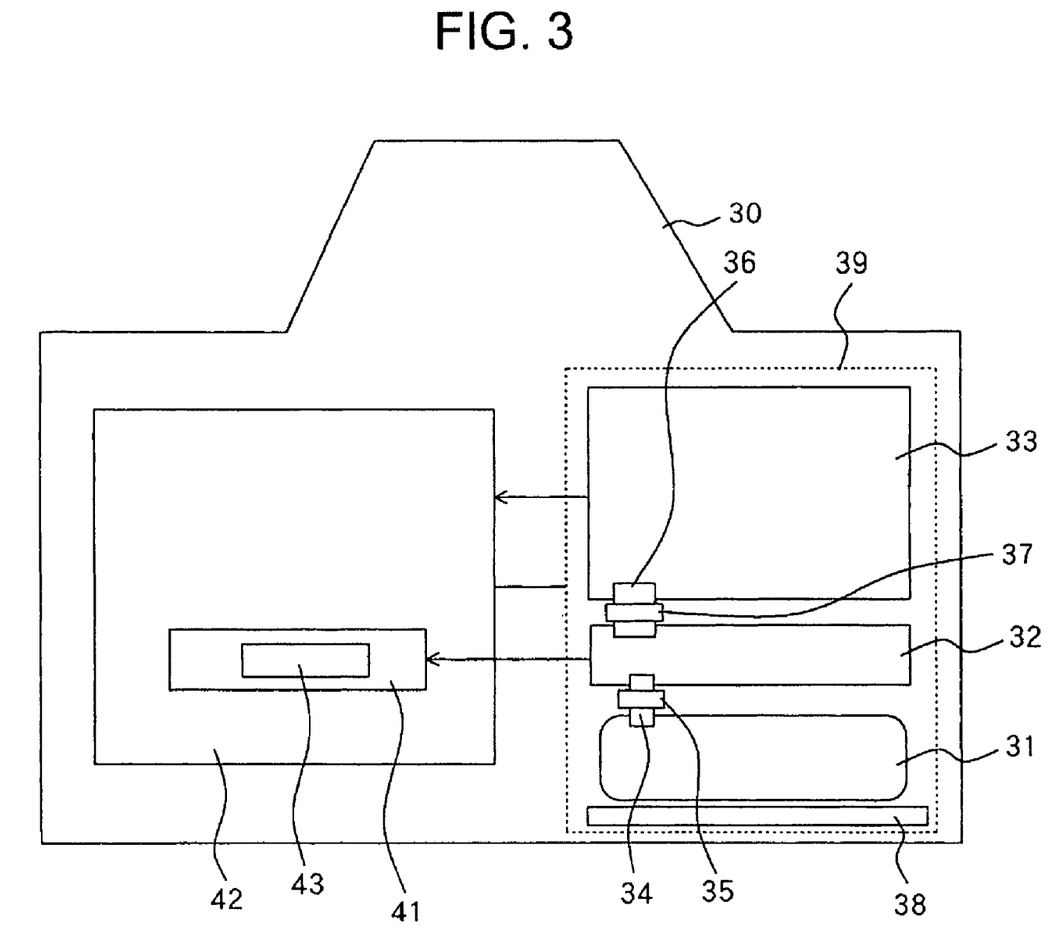
FIG. 3 is a block diagram showing an exemplary configuration of the electronic device and a fuel cell.
Figure 4:
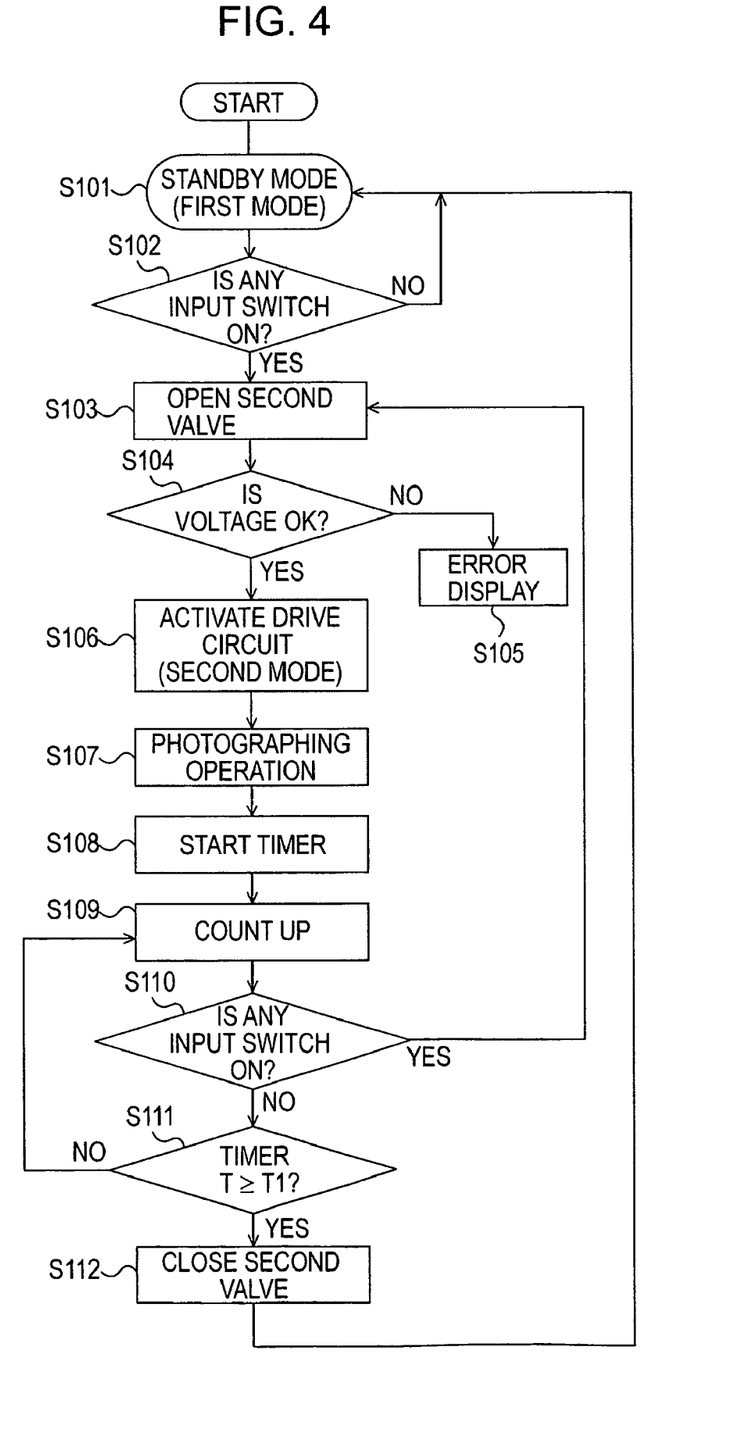
FIG. 4 is a flow chart illustrating an exemplary operation of the electronic device.

FIG. 1 is a front perspective view of a digital camera (with a lens detached) according to an embodiment of the present invention. FIG. 2 is a rear perspective view of the digital camera of FIG. 1. FIG. 3 is a block diagram showing the configuration of the digital camera with a fuel cell. FIG. 4 is a flow chart illustrating the operation of the digital camera. Although an image pickup device (digital camera) is described as an example in this embodiment, the present invention can be applied to other portable electronic devices such as a camcorder, PDA (Personal Digital Assistant), and computer.

Reference numeral 1 denotes a camera body. The camera body 1 is provided with a grip 1a projecting forward so that the user can easily hold the camera at the time of photographing. Reference numeral 2 denotes a mount at which a detachable photographing lens (not shown) is attached to the camera body 1. Reference numeral 4 denotes a lens release button to press when the photographing lens is detached.

Reference numeral 5 denotes a mirror box disposed in the camera body 1. The mirror box 5 surrounds light beams coming through the photographing lens. The mirror box 5 contains a quick-return mirror 6 that is held at an angle of about 45 degrees so as to guide the light beams coming through the photographing lens to a finder.

On the left side (as viewed from the front) of the top of the camera body 1, a shutter button 7, a main operation dial 8, an LCD panel 9, and an operation mode set button 10 are disposed. The shutter button 7 is an activation switch to start photographing. With the main operation dial 8, a shutter speed and a lens aperture value are set depending on the photographing operation mode at the time of photographing. The LCD panel 9 displays each photographing operation mode of the camera.

With the operation mode set buttons 10, whether continuous photographing or single photographing is performed at one pressing of the shutter button 7, a self-timer photographing mode, and the like are set. The setting status is displayed on the LCD panel 9.

In the middle of the top of the camera body 1, a pop-up strobe light unit 11, a mounting bracket or shoe 12 for mounting a flash, and a flash contact 13 are disposed thereon. On the right side of the top of the camera body 1, a photographing mode set dial 14 is disposed.

On the right side of the camera body 1, an openable external-terminal cover 15 is provided. Under this cover 15, a video signal output jack 16 and a USB output connector 17 are provided as external interfaces.

As shown in FIG. 2, on the back of the camera body 1, a finder eyepiece 18 and a color LCD 19 are provided. The finder eyepiece 18 is located above the optical axis. The color LCD 19 is located in the middle of the back of the camera body 1 and can display images. Beside the color LCD 19, a sub-operation dial 20 is disposed. The sub-operation dial 20 is responsible for helping the function of the main operation dial 8. For example, in the AE (automatic exposure) mode of the camera, the sub-operation dial 20 is used for setting the amount of correction to the exposure value calculated in the automatic exposure unit.

In manual mode setting, the shutter speed and the lens aperture value are set by the user. The shutter speed is set with the main operation dial 8. The lens aperture value is set with the sub-operation dial 20. This sub-operation dial 20 is also used for selecting an image to be displayed on the color LCD 19 from photographed images.

Next, a fuel cell incorporated in the electronic device (digital camera) of the present embodiment will be described in detail with reference to FIG. 3.

Reference numeral 30 denotes a digital camera (corresponding to the camera body 1) as an example of an electronic device powered by a fuel cell. Reference numeral 31 denotes a fuel tank. Reference numeral 32 denotes a first generating cell having a first generation capacity. Reference numeral 33 denotes a second generating cell having a second generation capacity. The generation capacity of the first generating cell 32 is smaller than that of the second generating cell 33.

The first and second generating cells 32 and 33 are housed in a fuel chamber 39 provided in the camera 30. When refueling is performed or when the first and second generating cells 32 and 33 are replaced due to performance degradation, the user can open a fuel-chamber lid 38 and remove the first and second generating cells 32 and 33.

Reference numeral 34 denotes a fuel supply route or passage to the first generating cell 32. The fuel supply route 34 includes a first valve 35 for controlling fuel supply. Reference numeral 36 denotes a fuel supply route or passage to the second generating cell 33. The fuel supply route 36 includes a second valve 37 for controlling fuel supply.

In this embodiment, the fuel tank 31, the first generating cell 32, and the second generating cell 33 are connected in series with the fuel supply routes 36 and 37. More specifically, the fuel tank 31 is connected to the first (smaller) generating cell 32, and the first generating cell 32 is connected to the second generating cell 33. That is to say, the second generating cell 33 is supplied with fuel not directly from the fuel tank 31 but through the first generating cell 32.

Reference numeral 41 denotes a first circuit that causes the digital camera 30 to operate in a standby mode (first mode). The first circuit 41 is provided with a CPU 43 serving as a control device. When the power switch of the digital camera 30 is turned on, the CPU 43 checks the status of various input switches, drives an image sensor, displays an image of an object formed on the image sensor, and displays information concerning photographing that needs to be always displayed. That is to say, the first circuit 41 is an operation circuit necessary for the initial operation to be performed after the power switch is turned on and before the shutter button (release switch SW1) 7 is turned on. In addition, the CPU 43 controls the first and second valves 35 and 37 independently and performs control of photographing operation and fuel and power supply in the digital camera 30.

The first circuit 41 operates powered by the first generating cell 32. The standby mode requires a voltage of, for example, about 3 V. Therefore, a generation capacity suitable for supplying such a voltage is enough for the first generating cell 32.

Reference numeral 42 denotes a second circuit that is driven when the digital camera 30 is in a photographing mode (second mode). In response to the turning on of an input switch in the standby mode, the second circuit 42 activates various actuators. More specifically, in the case where the operation of the shutter button 7 is detected, when the release switch SW1 is on, the second circuit 42 performs preparation for photographing, that is to say, performs photometry, detects a focus, and determines a shutter speed and exposure value. When another release switch SW2 is on, the second circuit 42 performs photographing operation, that is to say, drives a motor (not shown) to remove the quick-return mirror 6 from the photographing optical axis, controls a shutter (not shown) and the image sensor (not shown) to perform exposure, and then returns the quick-return mirror 6 to the standby position. The second circuit 42 includes a plurality of sub-circuits necessary for the above-described preparation and photographing operation.

The CPU 43 determines whether to continue the exposure or to return the standby mode on the basis of the status of the input switches. The second mode requires a voltage of, for example, about 8 V. The generation capacity of the second generating cell 33 is set to a size capable of performing the above-described operations and controls. The second circuit 42 operates powered by the second generating cell 33.

In the present embodiment, in these operation modes, the first valve 35 is always open when the fuel tank 31 is loaded in the digital camera 30 and fuel is always supplied to the first generating cell 32. That is to say, the first generating cell 32 is always filled with fuel, and therefore, the first circuit 41 can stably operate.

When the fuel tank 31 is replaced or refueled, the first valve 35 is closed by the CPU 43 to prevent fuel leakage. The first valve 35 may be opened or closed depending on the speed at which fuel is supplied from the first generating cell 32 to the second generating cell 33.

The second valve 37 for supplying fuel to the second generating cell 33 is closed when the digital camera 30 is powered off or in the standby mode. If any input switch operation is detected in this standby mode, the CPU 43 opens the second valve 37. Fuel is supplied to the second generating cell 33 through the first generating cell 32. The second circuit 42 is supplied with an amount of power required to function. In the case of continuous use, normally, the second generating cell 33 remains filled with fuel that is supplied at the previous fuel supply.

Next, the fuel supply control (power supply system) of the present embodiment will be described with reference to FIG. 4. Here, the fuel tank 31 is loaded, and the power switch of the digital camera 30 is turned on.

In response to the turning on of the power switch, power is supplied from the first generating cell 32 to the first circuit 41, and the CPU 43 starts controlling in the standby mode (S101). The CPU 43 monitors and checks whether each input switch is operated or not and determines whether any input switch is turned on or not (S102).

If the CPU 43 determines that no input switch is operated, the CPU 43 returns to step S101 and maintains the standby mode. If the CPU 43 determines that any input switch is operated, the CPU 43 proceeds to step S103.

In step S103, the CPU 43 opens the second valve 37 and supplies fuel, which has been supplied only to the first generating cell 32, to the second (larger) generating cell 33. Next, the voltage supplied from the second generating cell 33 to the second circuit 42 is checked (S104). If there is any abnormality in the voltage, the CPU 43 proceeds to step S105 and shows an error display on the screen of the digital camera 30. The purpose of this error handling is to inform the user that fuel is not supplied normally or the second generating cell 33 is not functioning normally.

If the voltage is determined as normal in the check of step S104, the CPU 43 proceeds to step S106 and activates the second circuit 42. As described above, for example, if the shutter button 7 is operated, the second circuit 42 performs photometry, focus detection, focusing, and lens driving operation, powered by the second generating cell 33.

Next, in step S107, photographing operations are performed. When a series of photographing operations are completed, the CPU 43 proceeds to step S108. In step S108, the CPU 43 starts a timer built in the digital camera 30. Until a predetermined time T1 has elapsed, steps S109 to S111 are repeated to check whether any input switch is operated. If any input switch is operated during the predetermined time T1 (S110), the CPU 43 returns to step S103. The CPU 43 maintains the second valve 37 open and supplies power from the second generating cell 33 to the second circuit 42.

If no input switch operation is detected in step S110, the CPU 43 proceeds to step S111 and checks whether the predetermined time T1 has elapsed. If the predetermined time T1 has not elapsed, the CPU 43 returns to step S109 and continues the countup. If the predetermined time T1 has elapsed, the CPU 43 proceeds to step S112. In step 112, the CPU 43 closes the second valve 37 and stops the fuel supply to the second generating cell 33. Next, the CPU 43 returns to the standby mode of step S101 and maintains the standby mode.

As described above, in the present embodiment, the first generating cell 32 and the second generating cell 33 are different in generation capacity, and the second generating cell 33 is supplied with fuel through the first generating cell 32 connected to the fuel tank 31.

The first generating cell 32 supplies an amount of power required for a minimum of operation that is performed after the digital camera 30 is powered on and before various operations are performed. The second generating cell 33 is supplied with a necessary amount of fuel depending on the state of the other operations as needed and generates electricity. Therefore, the fuel supply is efficient and the cells last longer than known conventional systems.

In other words, since the first generating cell 32 and the second generating cell 33 are different in generation capacity, and the second generating cell 33 is supplied with fuel through the first generating cell 32, power can be supplied according to characteristics of the circuits provided in the digital camera 30, and a stable operating environment can be provided without complicating control, for example, converting power.

Specifically, since the first generating cell 32 is always filled with fuel and the second generating cell 33 is supplied with fuel through the first generating cell 32, the remaining amount of fuel in each generating cell can be easily checked, and the fuel supply control can be simplified and performed accurately.

The second generating cell 33 generates electricity only as needed, depending on the state of operation of the digital camera 30. This makes it possible to reduce wasteful operation and extend the life of the generating cells.

Since the user can replace only the generating cell that needs to be replaced, the burden on the user can be reduced. That is to say, since the frequency of use differs between the first generating cell 32 having smaller generation capacity and the second generating cell 33 having greater capacity, the degree of deterioration also differs.

The first generating cell 32, which is frequently replaced, has a small generation capacity and is small in size. Therefore, the burden on the user can be reduced. In addition, the first generating cell 32 can be replaced more easily than the second generating cell 33, which is less frequently replaced.

Figure 5:
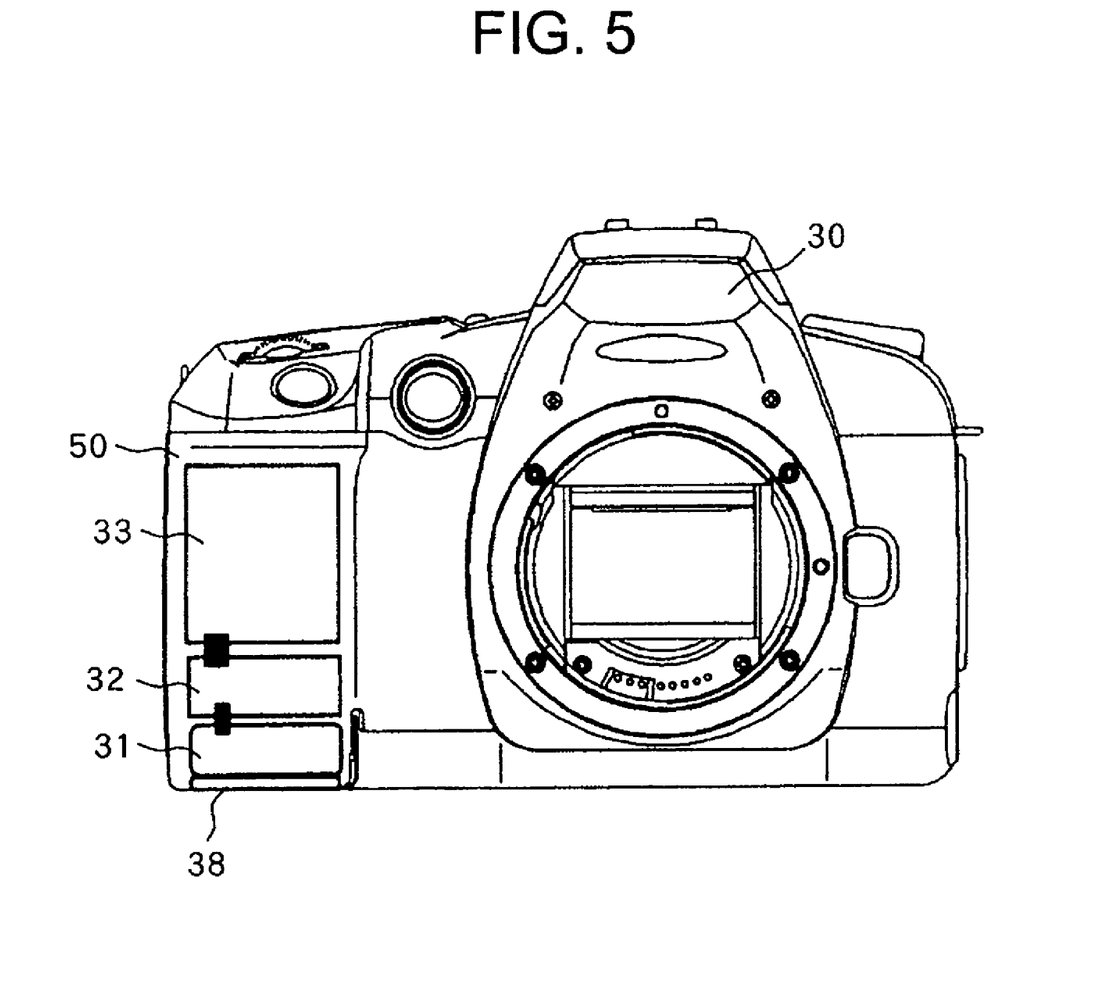
FIG. 5 is an exterior front perspective view of the electronic device showing an exemplary configuration of the fuel cell integrated into the body of the device.

FIG. 5 is an exterior front perspective view of the electronic device illustrating the arrangement of the fuel cell (power supply system) loaded in the digital camera (electronic device) in the present embodiment. In particular, FIG. 5 is a front view of the digital camera 30. A grip 50 is provided on the left side of the digital camera 30. When photographing, the user holds the grip 50. Normally the grip 50 forms a bulge so as to facilitate holding of the digital camera 30. Therefore, in this bulge, a large space different from the other spaces in the camera is ensured. In this space, large parts, for example, cells are housed.

In the present embodiment, as shown in FIG. 5, the grip 50 is adapted to house the fuel tank 31, the first generating cell 32, and the second generating cell 33. From the bottom to the top of the grip 50, the fuel-chamber lid 38, the fuel tank 31, the first valve 35 (fuel supply route 34), the first generating cell 32, the second valve 37 (fuel supply route 36), and the second generating cell 33 are disposed in this order.

Since the fuel tank 31, which is most frequently replaced, is disposed at the nearest position to the fuel-chamber lid 38, the user can easily replace the fuel tank 31. The second generating cell 33, which is least frequently replaced, is disposed at the farthest position from the fuel chamber lid 38.

Alternative Embodiments

As described above, in this embodiment, the first generating cell 32 and the second generating cell 33 are connected directly, and the second generating cell 33 is supplied with fuel through the first generating cell 32. Alternatively, a third generating cell may be provided between the first generating cell 32 and the second generating cell 33 in order to assist in supplying power to the first and second circuits 41 and 42 or to supply power to drive another third circuit. In this case, the second generating cell 33 is supplied with fuel through the first generating cell 32 and the third generating cell.

In this embodiment, the second circuit 42 performs photographing preparation and photographing operation. In addition, the second circuit 42 may display images that are photographed and stored in a storage medium, on the display in full screen or as thumbnails, powered by the second generating cell 33. The first circuit 41 performs only a minimum of operation required for moving to next operation when the digital camera 30 is powered on.

It is not necessary to place the first generating cell 32, the second generating cell 33, and the fuel tank 31 inside the digital camera 30. It is possible to place the first generating cell 32 and the second generating cell 33 inside the digital camera 30 and attach the fuel tank 31 to the outside of the digital camera 30. Alternatively, in addition to the fuel tank 31 placed inside the digital camera 30, a backup fuel tank may be provided outside the digital camera 30.

The first generating cell 32 and the fuel tank 31, which are more frequently replaced than the second generating cell 33, may be formed as a unit that can be detachably attached to the outside of the digital camera 30.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-040753 filed Feb. 17, 2005, which is hereby incorporated by reference herein in its entirety.

What is claimed is:

1. An electronic device comprising:
   a first electricity generating fuel cell configured to be supplied with fuel from a fuel tank; and
   a second electricity generating fuel cell configured to be supplied with fuel from the first electricity generating fuel cell, the fuel being not directly supplied from the fuel tank to the second electricity generating fuel cell which has a power generation capacity different from the first electricity generating fuel cell.

2. The electronic device according to claim 1, wherein the capacity of the second fuel cell is larger than the capacity of the first fuel cell.

3. The electronic device according to claim 1, further comprising a control device that controls fuel supply to the first fuel cell and the second fuel cell.

4. The electronic device according to claim 3, further comprising,
   a first valve capable of adjusting fuel supply to the first fuel cell; and
   a second valve capable of adjusting fuel supply to the second fuel cell,
   wherein the control device controls opening and closing operation of the first valve and the second valve.

5. The electronic device according to claim 3, wherein the control device causes the electronic device to operate in a first mode using electrical power from the first fuel cell, and causes the electronic device to operate in a second mode using power from the second fuel cell.

6. The electronic device according to claim 5, wherein the control device is supplied with power from the first fuel cell.

7. The electronic device according to claim 1, further comprising a chamber that detachably houses the first and second fuel cells, and wherein the first fuel cell is disposed nearer to the inlet of the chamber than the second fuel cell.

8. The electronic device according to claim 1, wherein the second fuel cell is disposed inside a grip for holding the electronic device.

9. The electronic device according to claim 8, wherein the first fuel cell and the fuel tank are disposed inside the grip.

10. A power supply system for an electronic device comprising:
    a fuel tank;
    a first electricity generating fuel cell configured to be supplied with fuel from the fuel tank; and
    a second electricity generating fuel cell configured to be supplied with fuel from the first electricity generating fuel cell, the fuel being not directly supplied from the fuel tank to the second electricity generating fuel cell which has a power generation capacity different from the power generation capacity of the first electricity generating fuel cell.

11. A camera comprising:
    a camera body;
    a fuel tank;
    a first electricity generating fuel cell configured to be supplied with fuel from the fuel tank; and
    a second electricity generating fuel cell configured to be supplied with fuel from the first electricity generating fuel cell, the fuel being not directly supplied from the fuel tank to the second electricity generating fuel cell which has a power generation capacity different from the first electricity generating fuel cell.

12. The camera according to claim 11, wherein the capacity of the second fuel cell is larger than the capacity of the first fuel cell.

13. The camera according to claim 11, further comprising a control device that controls fuel supply to the first and the second fuel cells.

14. The camera according to claim 13, further comprising,
    a first valve capable of adjusting fuel supply to the first fuel cell; and
    a second valve capable of adjusting fuel supply to the second fuel cell, wherein the control device controls opening and closing operation of the first and second valves.

15. The camera according to claim 13, wherein the control device causes the camera to operate in a first mode using electrical power from the first fuel cell, and causes the camera to operate in a second mode using power from the second fuel cell.

16. The camera according to claim 15, wherein the control device is supplied with power from the first fuel cell.

17. The camera according to claim 11, further comprising a chamber that detachably houses the first and second fuel cells, wherein the first fuel cell is disposed nearer to the inlet of the chamber than the second fuel cell.

18. The camera according to claim 11, wherein the second fuel cell is disposed inside a grip for holding the camera.

19. The camera according to claim 18, wherein the first fuel cell and the fuel tank are disposed inside the grip.

* * * * *